United States Patent [19]

Matsuda et al.

[11] 3,928,271

[45] Dec. 23, 1975

[54] PROCESS FOR PREPARATION OF ANIONIC POLYURETHANE EMULSIONS

[75] Inventors: Kazuo Matsuda; Hidemasa Ohmura; Hirakazu Aritaki, all of Wakayama, Japan

[73] Assignee: Kao Soap Co., Ltd., Tokyo, Japan

[22] Filed: Sept. 13, 1974

[21] Appl. No.: 505,680

[30] Foreign Application Priority Data
Sept. 18, 1973 Japan.............................. 48-105302

[52] U.S. Cl................ 260/29.2 TN; 260/75 N; 260/77.5 AM; 260/584 R
[51] Int. Cl.² .................. C08G 18/32; C08J 3/06
[58] Field of Search...260/584 R, 77.5 AM, 29.2 TN

[56] References Cited
UNITED STATES PATENTS

| | | | |
|---|---|---|---|
| 3,278,560 | 10/1966 | Gaertner | 260/584 |
| 3,419,533 | 12/1968 | Dieterich | 260/29.2 TN |
| 3,479,310 | 11/1969 | Dieterich et al. | 260/29.2 TN |
| 3,491,050 | 1/1970 | Keberle et al. | 260/29.2 TN |
| 3,836,493 | 9/1974 | Matsuda et al. | 260/29.2 TN |

*Primary Examiner*—John C. Bleutge
*Assistant Examiner*—Arthur H. Koeckert
*Attorney, Agent, or Firm*—Woodhams, Blanchard and Flynn

[57] ABSTRACT

A process for the preparation of anionic polyurethane emulsions comprising chain-extending a urethane prepolymer having isocyanate groups at the ends of the molecule with a polyalkylene polyamine having at least two primary or secondary amino groups and a functional group having the formula $-CH_2-CH(OH)-CH_2X$ 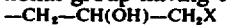

wherein X is Cl or Br, to form a polyurethane-urea-polyamine, reacting the polyurethane-urea-polyamine with a cyclic dicarboxylic acid anhydride and mixing that reaction product with an aqueous solution of a basic substance to form a polyurethane emulsion.

9 Claims, No Drawings

PROCESS FOR PREPARATION OF ANIONIC POLYURETHANE EMULSIONS

BACKGROUND OF THE INVENTION

1. Field of the Invention

This invention relates to a process for preparing polyurethane emulsions. More particularly, this invention relates to a process for preparing stable anionic self-emulsifiable polyurethane emulsions.

2. Description of the Prior Art

Various processes for the preparation of polyurethane emulsions have been known in the art. For example, an emulsifier-free polyurethane emulsion, namely, a so-called self-emulsifiable polyurethane emulsion, can be prepared by a process comprising reacting a polyhydroxyl compound with an excess of an organic polyisocyanate to form a urethane prepolymer having terminal isocyanate groups, chain-extending the urethane prepolymer with an active hydrogen atom-containing chain extender to form a polyurethane having primary or secondary amino or hydroxyl groups, reacting the resulting product with a cyclic dicarboxylic acid anhydride, and mixing the reaction product with an aqueous solution of a basic substance.

According to another known process, a polyurethane composition can be dispersed in water in the presence of an emulsifier.

In general, polyurethane resins have excellent physical and chemical properties. In practical use of polyurethane emulsions, however, there is a serious problem. More specifically, the physical and chemical properties of polyurethane resin films obtained from polyurethane emulsions prepared according to conventional processes such as those mentioned above are drastically inferior to the physical and chemical properties of films of cross-linked type polyurethane resins, because it is difficult to introduce cross-linkages in the polyurethane by chemical means or because of the presence of residual emulsifier in the polyurethane resin.

In general, when a polyurethane-containing polymer having tight cross-linkages is used, handling of the polymer during the preparation steps is very difficult because the polymer is infusible and insoluble. Accordingly, it is substantially impossible to obtain an emulsion by dispersing such a polymer into water, and even if the polyurethane polymer can be dispersed in water, in many cases the resulting emulsion is very unstable.

As an effective measure for overcoming this problem, there can be mentioned a process comprising reacting a urethane prepolymer with an excess of a polyalkylene polyamine, reacting the resulting polyurethane-urea-polyamine with an epihalohydrin, reacting the resulting product with a cyclic dicarboxylic acid anhydride, and mixing the resulting reaction product with an aqueous solution of a basic substance to form a polyurethane emulsion. However, in this process, because the reaction between the polyurethane-urea-polyamine and epihalohydrin is conducted in a polymeric system, the reactivity of the polyurethane-urea-polyamine is low and hence, in many cases cross-linkages are not fomed at a sufficient density in a heat-treated film obtained from the emulsion prepared according to this process.

SUMMARY OF THE INVENTION

We have discovered anionic self-emulsifiable polyurethane emulsions having a functional group having a cross-linkage-forming property.

More specifically, we have discovered that a halohydrin structure is very effective as a reactive functional group for forming cross-linkages during the heat treatment of a polyurethane resin, and that a polyalkylene polyamine having a functional group of the formula —$CH_2$—$CH(OH)$—$CH_2X$, in which X is Cl or Br, is very effective as a compound to be used for chain-extending a urethane prepolymer and thereby introducing an optional amount of a halohydrin structure into the resulting polymer.

In accordance with this invention, there is provided a process for preparing anionic polyurethane emulsions which comprises chain-extending a urethane prepolymer having terminal isocyanate groups, which is prepared from a polyhydroxyl compound and an excess of a polyisocyanate, with a polyalkylene polyamine having a functional group having the formula —$CH_2$—$CH(OH)$—$CH_2X$, in which X is Cl or Br, thereby to form a polyurethane-urea-polyamine, reacting the thus-formed product with a cyclic dicarboxylic acid anhydride and mixing the resulting reaction product with an aqueous solution of a basic substance to form an anionic self-emulsifiable polyurethane emulsion. The resin component in the thus-formed polyurethane emulsion either has no cross-linkages or it has only a very small number of cross-linkages. when a polyurethane resin film obtained by drying this polyurethane emulsion is heat-treated, tough cross-linkages are thereby formed and the physical and chemical properties of the polyurethane resin are highly improved. This specific property of the polyurethane emulsion, according to this invention, is one of prominent advantages of this invention.

The polyalkylene polyamine having a functional group of the formula —$CH_2$—$CH(OH)$—$CH_2X$, in which X is Cl or Br, which is used in this invention as a chain extender for a urethane prepolymer, is a reaction product obtained by reacting a polyalkylene polyamine with an epihalohydrin such as epichlorohydrin and epibromohydrin. It has the following formula (1)

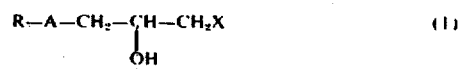

$$R-A-CH_2-CH-CH_2X \qquad (1)$$
$$\phantom{R-A-CH_2-}|\phantom{CH-CH_2X}$$
$$\phantom{R-A-CH_2-}OH$$

wherein X is Cl or Br, A is a secondary or tertiary amino group and R is an alkylene group having at least one primary or secondary amino group, with the proviso that the compound of the formula (1) includes at least two primary or secondary amino groups.

Accordingly, a polyurethane-urea-polyamine obtained by chain-extending a urethane prepolymer with a chain extender having the formula (1) contains a halohydrin structure in the molecule. Because of the presence of this halohydrin structure, tough cross-linkages are formed when a film of the resulting emulsion is heated.

The polyurethane-urea-polyamine used in this invention is obtained by reacting a urethane prepolymer having terminal isocyanate groups, which is derived from a polyhydroxyl compound and an excess of a polyfunctional isocyanate, with a chain extender of the formula (1) preferably in a ketone type solvent, such as acetone or methyl ethyl ketone.

As the polyfunctional isocyanate, there can be employed, for example, aromatic, aliphatic and alicyclic diisocyanates such as 1,5-naphthylene diisocyanate, 4,4'-diphenylmethane diisocyanate, 4,4'-diphenyldimethylmethane diisocyanate, di- and tetra-alkyldiphenylmethane diisocyanates, 4,4'-dibenzyl diisocyanate, 1,3-phenylene diisocyanate, 1,4'-phenylene diisocyanate and tolylene diisocyanate, chlorinated isocyanates, brominated isocyanates, phosphorus-containing isocyanates, 1,4-butylene diisocyanate, 1,6-hexamethylene diisocyanate, lysine diisocyanate, dicyclohexylmethane diisocyanate, cyclohexane 1,4-diisocyanate, xylene diisocyanate, and the like. Further, it is possible to employ triisocyanates such as 1methylbenzol-2,4,6-triisocyanate, biphenyl-2,4,4'-triisocyanate and triphenylmethane triisocyanate in combination with the above-mentioned diisocyanates.

The polyhydroxyl compounds used in the preparation of a urethane prepolymer to be used in the process of this invention are those having molecular weights of 200 to 10,000. Any of the known polyhydroxyl compounds customarily used for the preparation of polyurethanes, such as polyethers, polyesters, polyester amides, polyacetals, polythioethers, polybutadieneglycols and the like can be used in this invention.

As the polyether, there can be mentioned, for example, cyclic ethers such as those obtained by the ring-opening polymerization or copolymerization of ethylene oxide, propylene oxide, butylene oxide, tetrahydrofuran and the like, and graft copolymers thereof.

Further, homogeneous polyethers or mixed polyethers formed by condensation of, for example, hexanediol, methylhexanediol, heptandediol and octanediol can be employed. It is also possible to use propoxylated and ethoxylated glycols.

As typcial examples of the polyester, there can be mentioned polyester glycols obtained by dehydrating condensation of dibasic acids and saturated or unsaturated low-molecular-weight glycols such as ethyleneglycol, propyleneglycol, 1,3-butanediol, 1,4-butanediol, neopentylglycol, pentanediol, hexanediol, octanediol, 2-ethyl-1,3-hexanediol, 1,4-butynediol, bisphenol A, diethyleneglycol, dipropyleneglycol and the like, and polyester glycols obtained by ring-opening polymerization of cyclic ester compounds.

As the polythioether, there are preferably employed homopolycondensation products of thioglycols and copolycondensation products of thioglycols with other glycols.

As the polyacetal, there can be mentioned, for example water-insoluble polyacetals derived from hexanediol or 4,4'-dioxyethoxydiphenylmethane and formaldehyde.

Glycols customarily used together with the above polyhydroxyl compounds, such as ethylene glycol, diethyleneglycol, triethyleneglycol, butanediol, propanediol, 1,6-hexanediol, neopentylglycol and N-alkyldiethanol amines having an alkyl group of 1 to 22 carbon atoms can be used in combination with the polyols, if necessary.

As the polyalkylene polyamine used in the process of this invention, there can be used various polyalkylene polyamines such as polyethylene polyamine, polypropylene polyamine, polybutylene polyamine and the like.

More particularly, the polyalkylene polyamines used in this invention are polyamines containing in the molecule from 2 to about 4 connecting units having the formula $-C_nH_{2n}-$ wherein $n$ is an integer larger than one. The connecting units connect together the nitrogen atoms. The nitrogen atoms may be bound to adjacent carbon atoms in the $-C_nH_{2n}-$ unit, but they may not be bound to the same carbon atom.

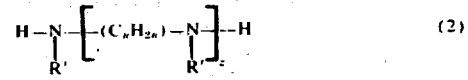

wherein $n$ is as defined above, $z$ is an integer from 2 to 4 and R', which can be the same or different, are hydrogen, alkyl having 1 to 4 carbons or hydroxyalkyl having 1 to 4 carbon atoms.

More specifically, there can be used not only such polyamines as diethylene triamine, triethylene tetramine, tetraethylene pentamine and dipropylene triamine but also mixtures and various crude products containing these polyamines.

It is also possible to use hydroxyalkyl-substituted polyamines in combination with the foregoing polyamines.

In some cases, in order to change the density of hydrophilic groups in the polyurethane emulsion obtained according to this invention or to improve the properties of the film made from the emulsion, it is desireable to chane or increase the distance between the active hydrogen-containing amino groups in the polyurethane-urea-polyamine molecules. This can be accomplished by replacing a part of the polyalkylene polyamine with ethylenediamine, propylenediamine, hexamethylenediamine, piperazine, phenylenediamine, a substitution product of such diamine with a saturated alkyl group of 1 to 22 carbon atoms, or an alkyleneoxide adduct, acrylonitrile adduct or acrylate adduct of such diamine. In general, the foregoing object can be achieved by replacing up to about 50 molar percent of the polyalkylene polyamine by the diamine.

As the epihalohydrin to be used for preparing the chain extender of the formula (1) by reaction with the above polyalkylene polyamine, epichlorohydrin and epibromohydrin are effectively used, but epichlorohydrin is preferred. The polyalkylene polyamine used is selected so that the chain extender of the formula (1) contains at least 2 amino groups and at least two of the amino groups contained are primary or secondary amino groups. When the polyalkylene polyamine is reacted with the epihalohydrin to form a chain extender of the formula (1), it is preferred that both are reacted in the presence of an inert organic solvent, such as benzene.

In the reaction between the polyalkylene polyamine and eiphalohydrin, the ratio of the two reactants differs depending on the number of amino groups contained in one molecule of the polyalkylene polyamine, but this ratio should be so selected that at least two primary or secondary amino groups are contained in one molecule of the product of the formula (1).

This reaction is generally conducted at a temperature of 10° to 80°C. When the reaction is carried out at too high a temperature, the product becomes resinous.

The reaction time varies depending on the reaction temperature and the kind of polyalkylene polyamine used, but it is generally preferred that the reaction is conducted for 0.5 to 5 hours.

Preparation of the isocyanate-terminated urethane prepolymer used in this invention is carried out in the presence of an inert solvent, such as benzene, or without a solvent.

When an aromatic polyisocyanate is used with the polyhydroxyl compound, a reaction temperature of 50° to 100°C is chosen, and when an aliphatic or alicyclic polyisocyanate is employed, a reaction temperature of 70° to 130°C is adopted.

In the preparation of the urethane prepolymer, it is preferred that the amount of the polyisocyanate is selected so that all of the hydroxyl groups are reacted with the isocyanate groups of the polyisocyanate.

More specifically, it is preferred that the ratio of the total mole number of the —NCO groups to the total mole number of the reactive hydrogen atoms (—OH groups) is within the range of from 1.1 : 1.0 to 5.0 : 1.0.

The reaction between the isocyanate-terminated urethane prepolymer and the chain extender of the formula (1) is preferably conducted under atmospheric pressure at a temperature ranging from −20° to +70°C in a ketone type solvent.

As the ketone type solvent there can be employed, for example, acetone, methylethylketone, diethylketone, dipropylketone, methylisobutylketone and methylisopropylketone. Use of acetone and methylethylketone is especially preferred.

It is possible to employ a mixed solvent of a ketone type solvent with benzene, tetrahydrofuran, dioxane, an acetic acid ester, dimethylformamide or a chlorinated solvent.

The reaction time varies depending on the reaction temperature and the reactivity of the polyisocyanate compound used. A shorter or longer reaction time is adopted depending on reaction conditions. The reaction is continued until the absorption at 2250 cm$^{-1}$ owing to the —NCO group disappears in the infrared absorption spectrum measured on samples of the reaction mixture taken during the reaction. In general, the reaction is carried out for 0.5 to 2 hours.

In the reaction of the isocyanate groups at both ends of the urethane prepolymer molecule with the chain extender of the formula (1), it is critical that the total mole number of the primary and secondary amino groups is greater than the total mole number of the isocyanate groups. As the total mole number of the amino groups becomes close to the total mole number of the isocyanate groups, the molecular weight of the resulting polyurethane-urea-polyamine becomes great, and a gelled product or a product having a great tendency to become gelated is formed. If the mole number ratio of the amino groups to the isocyanate groups is too high, the molecular weight of the resulting polyurethane-urea-polyamine becomes small, and if such a low-molecular-weight polyurethane-urea-polyamine is used as an intermediate for preparing the polyurethane emulsion, it is impossible to obtain a resinous product of excellent physical properties from such an emulsion. It is preferred that the ratio of the number (B) of moles of active hydrogen-containing amino groups in the chain extender of the formula (1) to the number (A) of isocyanate groups in the isocyanate-terminated urethane prepolymer is within the range of $1 < B/A \leq 5$, especially $1 < B/A \leq 3$. It is preferred that the polyurethane-urea-polyamine has a molecular weight of 5000 to 100000.

In the chain extender of the formula (1) there are present hydroxyl groups capable of reacting with isocyanate groups, but the reaction between the hydroxyl and isocyanate groups does not substantially proceed, because the rate of the reaction between the primary or secondary amino groups and the isocyanate groups is much higher than the rate of the reaction between the hydroxyl groups and the isocyanate groups and because the number of the primary and secondary amino groups is greater than the number of isocyanate groups. Accordingly, the hydroxyl groups contained in the chain extender are left substantially unreacted and they are connected to the resulting polyurethane-urea-polyamine in the free state (—OH).

The thus-formed polyurethane-urea-polyamine is then reacted with a cyclic dicarboxylic acid anhydride, and the resulting reaction product is mixed with an aqueous solution of a basic substance. There is obtained an anionic self-emulsifiable polyurethane emulsion. The solvent used for the reaction can be distilled off under heating, and the stability of the emulsion is not at all degraded by distillation of the solvent.

As the cyclic dicarboxylic acid anhydride used in this invention, there can be mentioned, for example, maleic anhydride, succinic anhydride, phthalic anhydride, dihydrophthalic anhydride, tetrahydrophthalic anhydride, hexahydrophthalic anhydride, trimellitic anhydride and itaconic anhydride. In general, the cyclic dicarboxylic anhydride is reacted in an amount equimolar to the amino groups of the polyurethane-urea-polyamine, at a temperature of 5° to 70°C, for 0.5 to 2 hours.

As the aqueous solution of the basic substance, there can be employed, for example, aqueous solutions of alkali metal hydroxides, carbonates and bicarbonates such as sodium hydroxide, potassium hydroxide, lithium hydroxide, sodium carbonate, sodium bicarbonate and potassium carbonate, aqueous ammonia, and aqueous solutions of lower water-soluble amines represented by the formulas $RNH_2$, $R_2NH$ or $R_3N$ in which R is alkyl of 1 to 4 carbon atoms, hydroxyethyl or hydroxypropyl.

The polyurethane emulsion prepared according to the process of this invention is a so-called self-emulsifiable emulsion free of an emulsifier. But in order to improve the stability of the emulsion, it is permissible to add a known emulsifier in such an amount as will not drastically change the properties of the polyurethane resin.

According to the foregoing process according to the invention, there can be obtained a low viscosity emulsion having ordinarily a resin content of 5 to 50 weight percent. The most prominent advantage of this invention is that the polyurethane resin contained in the thus-formed emulsion contains a reactive group —CH$_2$—CH(OH)—CH$_2$X, in which X is Cl or Br, which can form cross-linkages under heating.

When the polyurethane emulsion prepared according to this invention is impregnated into fibrous materials, non-woven fabrics, paper, leather, rubber, wood, metals, glass or plastics, or is coated or sprayed on surfaces of these substrates and then the emulsion is dried, films having improved touch and surface coatings of improved properties can be obtained. Further, the emulsion prepared according to the process of this invention can be used in the fields of civil engineering and construction and also as an adhesive or the like.

This invention will now be further described by reference to the following illustrative Examples which by no means limit the scope of this invention.

In the Examples, all references to "parts" and "percent" are on a weight basis unless otherwise indicated.

EXAMPLE 1

310.8 parts of dehydrated polyoxypropylene glycol, 4.03 parts of trimethylolpropane and 146.2 parts of an isomeric mixture of 2,4-tolylene diisocyanate and 2,6-tolylene diisocyanate at a 2,4-/2,6- molar ratio of 80/20 were reacted at 80°C for 3 hours to form a urethane prepolymer having a terminal isocyanate group content of 8.56 percent.

Separately, 61.8 parts of diethylene triamine (0.6 mole) were dissolved in 61.8 parts of methylethylketone, and the solution was charged in a round-bottom flask equipped with a thermometer and an agitator. A solution formed by dissolving 18.5 parts of epichlorohydrin (0.2 mole) in 18.5 parts of methylethylketone was added dropwise to the above solution over a period of 15 minutes at 30° to 45°C, and the mixture was reacted at 45°C for 1.5 hours to obtain a solution of a chain extender which contained no epoxide group but did contain covalently bonded chlorine.

61.4 parts of the thus-formed chain extender solution were diluted with 478 parts of methylethylketone, and 191.2 parts of the above urethane prepolymer diluted with 47.8 parts of methylethylketone were added dropwise to the diluted chain extender solution over a period of 30 minutes at 5° to 7°C. Then, the mixture was reacted at 50°C for 30 minutes.

A small amount of a sample was collected from the resulting polymer solution, and it was subjected to infrared absorption spectrum analysis. It was confirmed that no absorbtion owing to the —NCO group was present at 2250 cm$^{-1}$.

Then, 270 parts of the polymer solution was reacted with 10.4 parts of maleic anhydride at 50°C for 30 minutes, and then an aqueous solution formed by dissolving 4.24 parts of sodium hydroxide into 350 parts of water was added to the reaction product mixture. Methylethylketone was distilled off under reduced pressure to obtain a homogeneous, stable, low viscosity emulsion having a resin content of 10 percent.

The pH of the emulsion was 7.5 and the viscosity of the emulsion was 7.2 centistokes as measured at 25°C by an Ubbellohde's viscometer.

When the emulsion was diluted with water to various concentrations, the diluted emulsion remained homogeneous and stable.

This emulsion was cast into a smooth dish having a Teflon-coated surface and then air-dried to obtain a transparent flexible film. When this film was heat-treated at 120°C for 20 minutes, a film having the following properties was obtained:

| | |
|---|---|
| 100 percent modulus | 56 Kg/cm$^2$ |
| 300 percent modulus | 89 Kg/cm$^2$ |
| Tensile strength | 227 Kg/cm$^2$ |
| Elongation | 410 percent |

COMPARATIVE EXAMPLE 1

23.6 parts of diethylene triamine were diluted with 480 parts of methylethylketone, and was well blended in a round-bottom flask equipped with a thermometer and an agitator. Then, 191.2 parts of the urethane prepolymer obtained in Example 1 was diluted with 47.8 parts of methylethylketone and the diluted prepolymer was added dropwise to the above triamine dilution at 5° to 7°C over a period of 30 minutes. The mixture was then reacted at 50°C for 30 minutes.

A solution formed by dissolving 7.7 parts of epichlorohydrin in 30 parts of methylethylketone was added to 270 parts of the thus-formed polymer solution, and the reaction was conducted at 50°C for 1 hour. Then, the resulting product was reacted with 10.4 parts of maleic anhydride at 50°C for 30 minutes, and then an aqueous solution formed by dissolving 4.24 parts of sodium hydroxide in 350 parts of water was added to the reaction product mixture and methylethylketone was distilled off under reduced pressuure to obtain a homogeneous stable emulsion having a resin content of 10 percent.

The physical properties of a film obtained from this emulsion heat-treated in the same manner as described in Example 1 were as follows:

| | |
|---|---|
| 100 percent modulus | 55 Kg/cm$^2$ |
| 300 percent modulus | 83 Kg/cm$^2$ |
| Tensile strength | 142 Kg/cm$^2$ |
| Elongation | 370 percent |

When Example 1 (process of this invention) is compared with Comparative Example 1, it will readily be understood that the film formed from the polyurethane emulsion prepared according to the process of this invention had unexpectedly improved mechanical properties.

EXAMPLE 2

A mixture of 205.9 parts of dehydrated polytetramethylene ether glycol (OH value = 54.5), 109.8 parts of benzene and 50.4 parts of 1.6-hexamethylene diisocyanate was reacted at 80°C for 4.5 hours to obtain a solution of a urethane prepolymer having a terminal isocyanate group content of 4.51 percent.

Separately, a solution formed by dissolving 103 parts of diethylene triamine in 103 parts of methylethylketone was charged into a round-bottom flask, and a solution formed by dissolving 92.5 parts of epichlorohydrin in 92.5 parts of methylethylketone was added dropwise to the above solution in the same manner as in Example 1, and the mixture was reacted in the same manner as in Example 1 to obtain a solution of a chain extender.

Then, 29.7 parts of the thus-formed chain extender solution was dissolved in 400 parts of methylethylketone, and the solution was well mixed in a round-bottom separable flask equipped with an agitator and a thermometer. Then, 120 parts of the above urethane prepolymer solution diluted with 180 parts of methylethylketone was added dropwise to the solution over a period of 20 minutes at 30°C, and the mixture was reacted at 50°C for 30 minutes. Then, a solution of 9.6 parts of maleic anhydride in 100 parts of methylethylketone was added to 700 parts of the thus-formed polymer solution and the mixture was reacted at 50°C for 30 minutes. Then, an aqueous solution of 3.9 parts of sodium hydroxide in 400 parts of water was added to the resulting reaction product mixture and methylethylketone was distilled off under reduced pressure to obtain a homogeneous stable emulsion having a resin content of 20 percent.

A film prepared from this emulsion and heat-treated in the same manner as described in Example 1 had the following mechanical properties:

| 100 percent modulus | : | 17 Kg/cm² |
| 300 percent modulus | : | 38 Kg/cm² |
| Tensile strength | : | 293 Kg/cm² |
| Elongation | : | 820 percent |

COMPARATIVE EXAMPLE 2

7.8 parts of diethylene triamine were dissolved in 420 parts of methylethylketone and the solution was well blended in a round-bottom separable flask equipped with an agitator and a thermometer. 120 parts of the urethane prepolymer solution obtained in Example 2 was diluted in 180 parts of methylethylketone and the diluted urethane prepolymer solution was added dropwise to the above solution over a period of 20 minutes at 30°C. The mixture was reacted at 50°C for 30 minutes.

9.0 parts of epichlorohydrin was added to 700 parts of the thus-formed polymer solution, and the reaction was conducted at 50°C for 1 hours. Then, a solution of 9.6 parts of maleic anhydride in 100 parts of methylethylketone was added to the resulting reaction product mixture, and the reaction was further conducted at 50°C for 30 minutes. Then, a solution of 3.9 parts of sodium hydroxide in 400 parts of water was added to the reaction mixture and methylethylketone was distilled off under reduced pressure to obtain a homogeneous stable emulsion having a resin content of 20 percent.

A film prepared from this emulsion, heat-treated in the same manner as described in Example 1 had the following mechanical properties:

| 100 percent modulus | : | 16 Kg/cm² |
| 300 percent modulus | : | 24 Kg/cm² |
| Tensile strength | : | 186 Kg/cm² |
| Elongation | : | 880 percent |

When Example 2 (process of this invention) is compared with Comparative Example 2, it will be readily understood that the film obtained from the emulsion prepared according to the process of this invention had unexpectedly improved mechanical properties.

EXAMPLE 3

A mixture of 405 parts of dehydrated polytetramethylene glycol (OH value = 55.4), 445 parts of methylethylketone and 40 parts of an isomeric tolylene diisocyanate mixture of a 2,4-/2,6- molar ratio of 80/20 was reacted at 80°C for 28 hours to obtain a urethane prepolymer haivng a terminal isocyanate group content of 0.28 percent.

Separately, 5.5 parts of the chain extender solution prepared in Example 2 was diluted with 708 parts of methylethylketone, and the dilution was charged in a round-bottom flask. Then, 354 parts of the above urethane prepolymer solution was added dropwise to the dilution over a period of 15 minutes at 24°C, and the mixture was reacted at 50°C for 30 minutes.

A solution of 0.6 part of succinic anhydride in 30 methylethylketone was added to 350 parts of the thus-obtained polymer solution, and the reaction was conducted at 50°C for 30 minutes. Then, 400 parts of a dilute aqueous solution of sodium hydroxide was added to 225 parts of the resulting reaction mixture to adjust the pH to 7.5, and methylethylketone was distilled off to obtain a milky-white homogeneous emulsion.

A film prepared from this emulsion, heat-treated in the same manner as described in Example 1, had the following properties:

| 100 percent modulus | : | 13 Kg/cm² |
| 300 percent modulus | : | 17 Kg/cm² |
| Tensile strength | : | 286 Kg/cm² |
| Elongation | : | 920 percent |

EXAMPLE 4

A mixture of 1020 parts of dehydrated polytetramethylene ether glycol (OH value = 110), 651 parts of benzene and 500 parts of diphenylmethane-4,4'-diisocyanate was reacted at 70°C for 3 hours to obtain a solution of a urethane prepolymer having a terminal isocyanate group content of 3.85 percent.

Separately, a dilution of 36.2 parts of the chain extender solution prepared in Example 1 with 500 parts of acetone was charged in a round-bottom flask. Then, 250 parts of the above urethane prepolymer solution was added dropwise to this dilution at 25°C over a period of 40 minutes, and the mixture was reacted at 50°C for 1 hour. Then, a solution of 17.2 parts of maleic anhydride in 150 parts of acetone was added to the reaction product mixture, and the mixture was reacted at 50°C for 30 minutes.

The thus-obtained polymer solution was incorporated with 22 parts of 28 percent aqueous ammonia and 500 parts of water, and the mixture was well blended. Then, benzene and acetone were distilled off under reduced pressure, and water was added to the residual mixture to adjust the concentration. Thus there was obtained a homogeneous emulsion having a resin content of 30 percent.

A film prepared from this emulsion, heat-treated in the same manner as in Example 1, had the following mechanical properties:

| 100 percent modulus | : | 38 Kg/cm² |
| 300 percent modulus | : | 107 Kg/cm² |
| Tensile strength | : | 344 Kg/cm² |
| Elongation | : | 480 percent |

EXAMPLE 5

A mixture of 984 parts of a hydroxyl-terminated polyester glycol (OH value = 114) prepared from 1,4-butanediol and adipic acid by dehydrating condensation, 583 parts of benzene and 376 parts of xylene diisocyanate was reacted at 80°C for 4 hours to obtain a solution of a urethane prepolymer having a terminal isocyanate group content of 4.32 percent.

A dilution of 59.1 parts of the chain extender solution prepared in Example 2 with 500 parts of methylethylketone was well blended in a round-bottom flask, and 250 parts of the above urethane prepolymer solution was added dropwise to the dilution at 28°C over a period of 25 minutes, and the mixture was reacted at 50°C for 40 minutes.

Then, 29.4 parts of phthalic anhydride was added to the reaction mixture, and the reaction was further conducted at 50°C for 30 minutes. A solution of 8 parts of sodium hydroxide in 940 parts of water was added to the reaction mixture, and the mixture was well blended and the organic solvents used were distilled off under reduced pressure to obtain an emulsion having a resin content of 20 percent.

A film prepared from this emulsion, heat-treated in the same manner as in Example 1, had the following mechanical properties:

| | | |
|---|---|---|
| 100 percent modulus | : | 31 Kg/cm² |
| 300 percent modulus | : | 87 Kg/cm² |
| Tensile strength | : | 292 Kg/cm² |
| Elongation | : | 540 percent |

The embodiments of the invention in which an exclusive property or privilege is claimed are defined as follows:

1. A process for preparing an anionic polyurethane emulsion, which comprises,
   1. reacting, in the liquid phase and in a ketone solvent, at a temperature of from −20° to +70°C, (A) isocyanate-terminated urethane prepolymer prepared by reacting organic polyol having a molecular weight in the range of from 200 to 10000 with an excess of organic polyisocyanate, with (B) an excess of polyalkylene polyamine having at least two primary or secondary amino groups and also having a functional group of the formula —CH₂—CH(OH)—CH₂X, wherein X is chloro or bromo, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting, in the liquid phase, at a temperature of from 5° to 70°C, for from 0.5 to 2 hours, the reaction product of step 1 with cyclic dicarboxylic acid anhydride in an amount substantially equimolar to the amino groups of the polyurethane-urea-polyamine,
   3. adding to the reaction product of step 2 an aqueous solution of a basic substance to adjust the pH of the product of step 2 to be in the range of about 6 to about 9, and
   4. treating the product of step 3 to remove the organic solvent therefrom and thereby obtaining an aqueous anionic polyurethane emulsion as a final product.

2. A process according to claim 1, in which the reactant (B) includes up to 50 percent, by molecular equivalent, of diamines or alkyleneoxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is in the range of $1 < b/a \leq 5$.

4. A process according to claim 1, in which the polyalkylene polyamine has the formula

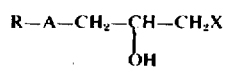

wherein X is Cl or Br, A is a secondary or tertiary amino group and R is alkylene having at least one primary or secondary amino group, provided that the sum of the primary and secondary amino groups in the polyalkylene polyamine is at least two.

5. A process according to claim 4, in which said polyalkylene polyamine is prepared by reacting, at from 10° to 80°C, for from 0.5 to 5 hours, epichlorohydrin or epibromohydrin with a polyamine having the formula

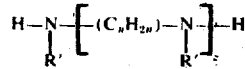

wherein n is an integer larger than one, z is an integer from 2 to 4 and R' is hydrogen, alkyl having one to 4 carbon atoms or hydroxyalkyl having one to 4 carbon atoms.

6. A process according to claim 1, in which said cyclic dicarboxylic acid anhydride is selected from the group consisting of maleic anhydride, succinic anhydride, phthalic anhydride, dihydrophthalic anhydride, tetrahydrophthalic anhydride, hexahydrophthalic anhydride, trimellitic anhydride and itaconic anhydride.

7. A process according to claim 1, in which said basic substance is selected from the group consisting of alkali metal hydroxides, carbonates and bicarbonates and water soluble amines of the formulas $RNH_2$, $R_2NH$ and $R_3N$ wherein R is alkyl of 1 to 4 carbon atoms, hydroxyethyl or hydroxypropyl.

8. An aqueous anionic polyurethane emulsion prepared by the process of claim 1.

9. A polyurethane molded product prepared by forming the emulsion of claim 8 into a molded product and then heat-treating the product to effect cross-linking.

* * * * *